(12) United States Patent
Robinson et al.

(10) Patent No.: US 6,346,776 B1
(45) Date of Patent: Feb. 12, 2002

(54) FIELD EMISSION ARRAY (FEA) ADDRESSED DEFORMABLE LIGHT VALVE MODULATOR

(75) Inventors: William P. Robinson; Robert Mark Boysel, both of Thousand Oaks, CA (US)

(73) Assignee: MEMSolutions, Inc., Westlake Village, CA (US)

(*) Notice: Subject to any disclaimer, the term of this patent is extended or adjusted under 35 U.S.C. 154(b) by 0 days.

(21) Appl. No.: 09/612,909

(22) Filed: Jul. 10, 2000

(51) Int. Cl.⁷ .............................................. G09G 3/10
(52) U.S. Cl. ............................. 315/169.3; 315/169.1; 315/169.2; 315/169.4; 313/310; 313/311
(58) Field of Search ........................... 315/169.1, 169.2, 315/169.3, 169.4; 313/310–311

(56) References Cited

U.S. PATENT DOCUMENTS

| | | | |
|---|---|---|---|
| 2,681,380 A | 6/1954 | Orthuber | 178/5.4 |
| 2,682,010 A | 6/1954 | Orthuber | 315/3 |
| 2,733,501 A | 2/1956 | Orthuber et al. | 29/25.17 |
| 3,517,126 A | 6/1970 | Yamada et al. | 178/7.5 |
| 3,600,798 A | 8/1971 | Lee | 29/592 |
| 3,676,588 A | 7/1972 | Kozol et al. | 178/7.5 D |
| 3,678,196 A | 7/1972 | Roth | 178/7.5 D |
| 3,746,911 A | 7/1973 | Nathanson et al. | 315/21 R |
| 3,858,808 A | 1/1975 | Wohl | 313/394 |
| 3,886,310 A | 5/1975 | Guldberg et al. | 178/7.5 D |
| 3,896,338 A | 7/1975 | Nathanson et al. | 315/373 |
| 4,229,732 A | 10/1980 | Hartstein et al. | 340/378.2 |
| 4,387,964 A | 6/1983 | Arrazola et al. | 350/331 R |
| 4,441,791 A | 4/1984 | Hornbeck | 350/360 |
| 4,592,628 A | 6/1986 | Altman et al. | 350/486 |
| 4,615,595 A | 10/1986 | Hornbeck | 353/122 |

(List continued on next page.)

OTHER PUBLICATIONS

S. Newman, et al., "Development of a 5.1 Inch Field Emission Display," Motorola Flat Panel Display Division, SID 1998.

Lawrence Dworsky, et al. "Field Emission Display Technology and Applications," Motorola Flat Panel Display Division, SID 1998.

B. Chalamala et al., "FED up with Fat Tubes," IEEE Spectrum, vol. 35, No. 4, p. 41–51, Apr. 1998.

R. Noel Thomas et al., "The Mirror–Matrix Tube: A Novel Light Valve for Projection Displays," IEEE Transactions on Electron Devices, vol. ED–22, No. 9, Sep. 1975, p. 765.

J.A. van Raalte, "A New Schlieren Light Valve for Television Projection," Applied Optics vol. 9, No. 10. (Oct. 1970), p. 2225.

B. James Ross et al., "Performance Characteristics of the Deformographic Storage Display Tube (DSDT)," 1973 IEEE Intercon Technical Papers, pp. 1–8.

*Primary Examiner*—Don Wong
*Assistant Examiner*—Jimmy T. Vu
(74) *Attorney, Agent, or Firm*—Fleshner & Kim, LLP (57) ABSTRACT

A compact, high resolution, bright and long life modulator for projection displays, mates a field emission array (FEA) with a deformable light valve modulator (DLVM) of reflective operation in a thin vacuum package. The DLVM includes a continuous film mirror layer formed on or between one or more deformable layers on a transparent substrate. The field emitters (at least one per pixel) are driven to deliver primary electrons that strike and deposit a charge that produces electrostatic forces that locally deform the continuous film mirror layer. Because the mirror layer is a continuous film, i.e. not pixelated, the modulator resolution is limited only by the addressing resolution of the FEA. Mating the FEA and DLVM technologies also reduces the drive voltage requirements associated with typical FEA driven phosphor displays and scanned beam DLVMs thus improving their performance and extending the lifetime of each.

14 Claims, 10 Drawing Sheets

U.S. PATENT DOCUMENTS

| | | | |
|---|---|---|---|
| 4,680,579 A | 7/1987 | Ott | 340/783 |
| 4,698,602 A | 10/1987 | Armitage | 332/7.51 |
| 4,710,732 A | 12/1987 | Hornbeck | 332/7.51 |
| 4,728,174 A | 3/1988 | Grinberg et al. | 350/334 |
| 4,744,636 A | 5/1988 | Haven et al. | 350/331 R |
| 4,765,717 A | 8/1988 | Buzak et al. | 350/331 R |
| 4,784,883 A | 11/1988 | Chitwood et al. | 428/1 |
| 4,786,149 A | 11/1988 | Hoenig et al. | 350/356 |
| 4,794,296 A | 12/1988 | Warde et al. | 313/105 R |
| 4,805,038 A | 2/1989 | Seligson | 358/296 |
| 4,826,293 A | 5/1989 | Grinberg et al. | 350/331 R |
| 4,884,874 A | 12/1989 | Buzak et al. | 350/336 |
| 4,956,619 A | 9/1990 | Hornbeck | 330/4.3 |
| 5,083,857 A | 1/1992 | Hornbeck | 359/291 |
| 5,142,405 A | 8/1992 | Hornbeck | 359/226 |
| 5,172,262 A | 12/1992 | Hornbeck | 359/223 |
| 5,196,767 A | 3/1993 | Leard et al. | 315/349 |
| 5,280,277 A | 1/1994 | Hornbeck | 345/108 |
| 5,287,215 A | 2/1994 | Warde et al. | 359/293 |
| 5,416,514 A | 5/1995 | Janssen et al. | 348/196 |
| 5,442,414 A | 8/1995 | Janssen et al. | 353/98 |
| 5,444,566 A | 8/1995 | Gale et al. | 359/291 |
| 5,448,314 A | 9/1995 | Heimbuch et al. | 348/743 |
| 5,452,024 A | 9/1995 | Sampsell | 348/755 |
| 5,471,341 A | 11/1995 | Warde et al. | 359/293 |
| 5,477,110 A | 12/1995 | Smith et al. | 315/169.3 |
| 5,493,439 A | 2/1996 | Engle | 359/292 |
| 5,504,614 A | 4/1996 | Webb et al. | 359/223 |
| 5,508,738 A | 4/1996 | Janssen et al. | 348/196 |
| 5,552,925 A | 9/1996 | Worley | 359/230 |
| 5,557,177 A | 9/1996 | Engle | 315/366 |
| 5,567,334 A | 10/1996 | Bake et al. | 216/24 |
| 5,579,151 A | 11/1996 | Cho | 359/291 |
| 5,600,383 A | 2/1997 | Hornbeck | 348/771 |
| 5,610,478 A | 3/1997 | Kato et al. | 315/169.1 |
| 5,631,782 A | 5/1997 | Smith et al. | 359/871 |
| 5,650,881 A | 7/1997 | Hornbeck | 359/871 |
| 5,669,687 A | 9/1997 | Yang | 353/98 |
| 5,677,784 A | 10/1997 | Harris | 359/290 |
| 5,689,278 A | 11/1997 | Barker et al. | 345/74 |
| 5,706,061 A | 1/1998 | Marshall et al. | 348/743 |
| 5,729,094 A * | 3/1998 | Geis et al. | 315/169.1 |
| 5,768,009 A | 6/1998 | Little | 359/293 |
| 5,774,196 A | 6/1998 | Marshall | 348/743 |
| 5,822,110 A | 10/1998 | Dabbaj | 359/293 |
| 5,903,243 A | 5/1999 | Jones | 345/7 |
| 5,903,804 A | 5/1999 | Kirkpatrick et al. | 399/154 |
| 6,034,810 A | 3/2000 | Robinson et al. | 359/293 |
| 6,060,840 A * | 5/2000 | Foo et al. | 315/169.1 |
| 6,184,626 B1 * | 2/2001 | Oda | 315/169.3 |

\* cited by examiner

FIG. 1

(Prior Art)

FIG. 2

(Prior Art)

FIELD EMISSION ARRAY (FEA) ADDRESSED DEFORMABLE LIGHT VALVE MODULATOR

BACKGROUND OF THE INVENTION

1. Field of the Invention

This invention relates to field emission displays (FEDs) and more specifically to a light modulator technology that employs a field emitter array (FEA) to address a deformable light valve modulator of reflective operation.

2. Description of the Related Art

Image displays are used to convert electrical signals into viewable images. The most common technology used in both projection and direct-view displays is the cathode ray tube (CRT), in which a scanning electron gun shoots one or several beams of electrons across a vacuum to scan a phosphor-coated anode. The electrons penetrate the individual phosphors causing them to emit light and taken together produce a direct view image. By necessity, the gun must sit far from the anode to raster scan the phosphor screen, a distance similar to the width of the display area. As a result, high-resolution large area direct-view displays are correspondingly very large and very heavy.

During the past 40 years numerous attempts have been made to construct a "Flat-CRT", which can overcome the length and weight limitations of the conventional CRT without sacrificing performance. With few exceptions, these efforts have failed commercialization due to serious complexities in the electron source and mechanical structure, but a new alternative called the Field Emission Display (FED) has recently appeared that has shown promise in overcoming these barriers. The FED utilizes a matrix addressed cold cathode array, spacers to support the atmospheric pressure, and cathodoluminescent phosphors for efficient conversion of the electron beams into visible light. The non-linearity of the current/voltage relationship permits matrix addressing of high information content displays while providing high contrast ratio.

The FED combines the best properties of CRTs (full color, full grayscale, brightness, video rate speeds, wide viewing angle and wide temperature range) with the best attributes of Flat Panel technology (thin and light weight, linearity and color convergence). However, the current production FEDs have limited display sizes, 10 inch diagonal or less, due to the fabrication and vacuum packaging problems. Since the primary motivation for Flat-CRTs was to overcome the size and weight limitations of the conventional CRT for large display sizes, this is a serious problem to successful commercialization of the FED technology.

To appreciate FEDs, one must understand the physics of field emission. The potential barrier at the surface of a metallic conductor binds electrons to the bulk of the material. This potential barrier is called the work function, and is defined as the potential difference between the Fermi level and the height of the barrier. For an electron to leave the material, the electron must gain an energy that exceeds the work function. This can be accomplished in a number of ways, including thermal excitation (thermionic emission), electron and ionic bombardment (secondary emission), and the absorption of photons (photoelectric effect). Fowler-Nordheim emission or field emission differs from these other forms of emission in that the emitted electrons do not gain an energy that exceeds the material work function.

Field emission occurs when an externally applied electric field at the material surface thins the potential barrier to the point where electron tunneling occurs, and thus differs greatly from thermionic emission. Since there is no heat involved, field emitters are a "cold cathode" electron source. One needs to apply an electric field on the order of 30–70 MV/cm at the surface of a metallic conductor to produce significant tunneling current. For example, if an electrode were placed 1 $\mu$m from the surface of a conductor it would take 1000 V between the electrode and cathode to induce significant current flow. Obviously, a flat-panel display (FPD) that is addressed at 1000 V is of little use. Therefore, "field enhancement" is used to lower the necessary addressing voltages.

A field emitter is a sharp point, or whisker, with a connecting cathode electrode, a dielectric layer, and an isolated extraction gate in close proximity. If a positive potential is applied between the gate and cathode, a uniform electric field is produced in the dielectric. But the presence of the sharp tip emitter produces a compression of the equipotential lines at the tip, and thus a high electric field. Field enhancement is a geometric property and is strongly dependent on the sharpness of the tip. Note that the dielectric must hold off the unenhanced field, so field enhancement is essential for operation of field emitters. With field enhancement, a reasonable voltage applied to the extraction gate results in electron emission at the point.

Figure 1:
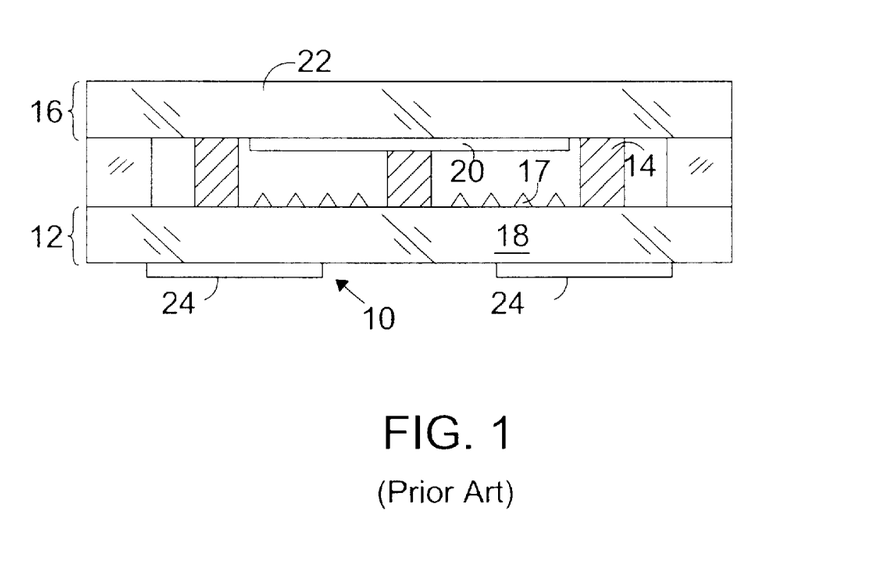
FIG. 1, as described above, is a sectional view of a known FED.

As shown in FIG. 1, a vacuum packaged FED 10 includes a matrix-addressed cold cathode array 12, spacers 14 that support atmospheric pressure and a cathodoluminescent anode 16. Cathode array 12 is composed of row and column conductors separated by an insulating layer (not shown) with interspersed field emitter tips 17. These layers are deposited on an insulating substrate 18, such as glass. The locations where the rows and column cross define a pixel. The row conductors serve as the extraction gate and the column conductors connect to the cathodes.

Anode 16 is the phosphor screen and is composed of phosphor powders 20, which are typically deposited within a black matrix on a glass substrate 22. The entire anode 16 is covered with a thin aluminum layer, which acts both as a reflector to enhance brightness and as an anode voltage stabilizer by prevent charging of the phosphor powders. The cathode and screen, along with spacer materials, are aligned, sealed, and evacuated to complete the vacuum package.

Electron emission from each pixel is controlled by a forward bias between the gate and cathode. Once released from the confines of the bulk material, the emitted electrons are accelerated toward the phosphor screen. A focusing grid (not shown), which is biased at a negative potential with respect to the cathode, is often used to focus the electrons as they are accelerated toward the screen. The voltage applied to the screen must be higher than the cathode voltage or the emitted electrons. The screen voltage must also be high enough so that most of the electrons' energy remains once they penetrate the aluminum layer covering the phosphor particles.

Figure 2:
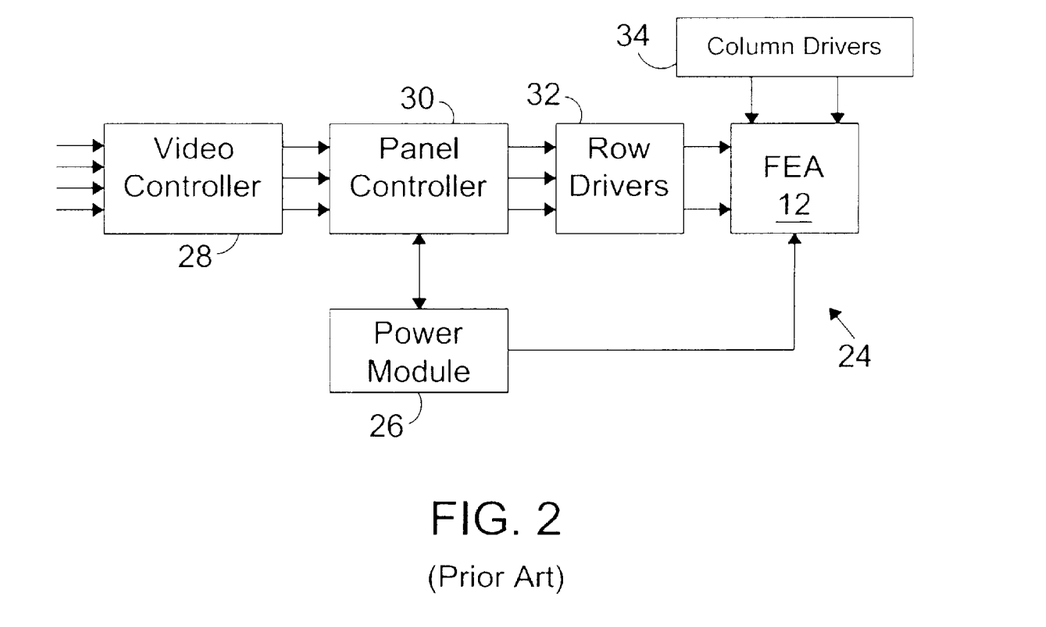
FIG. 2, as described above, is a schematic block diagram of the drive electronics for the FED shown in FIG. 1.

As shown in FIG. 1 and in more detail in FIG. 2, drive electronics 24 are needed to control operation of the vacuum packaged FED, specifically the cathode array 12. The drive electronics subsystems include a power module 26, a video controller 28, panel controller 30, and row and column drivers 32 and 34, respectively. The component subsystems will differ depending on whether the input is analog or digital.

For an analog composite video signal containing red, green, and blue (RGB) information and timing signals, video controller 28 samples the analog video signal, digitizes it, and separates it into RGB components. Horizontal and vertical timing information is also extracted from the composite input. Video controller 28 then presents the digitized video information to panel controller 30 in the form required by a standard digital video interface specification. This standard specifies digital RGB data up to 18 bits in parallel, horizontal and vertical sync, a pixel clock, and a data valid signal. Other processing that may be required in the video controller are gamma correction and adjustment of color saturation, brightness, and contrast.

In order to keep the FED compatible with other FPD technologies that accept digital input, panel controller 30 must accept the standard digital-interface signals and extract the signals necessary to drive the FED row and column drivers 32 and 34. In most cases, the signals appearing at the digital interface are used directly by the row and column drivers, and the functionality of the panel controllers is minimal. However, depending on the drive approach used and on the design of the drivers, some functionality may be required on the panel.

Line-by-line addressing is used to display an image on the FED. Typically, the row connections are the FED gates, and the columns are the FED cathodes. The rows are scanned sequentially from top to bottom. As each row is selected, the columns are used to modulate the current in the pixels of the selected row. This results in dwell times much longer than those produced by the flying spot of a conventional CRT. The longer dwell time permits lower pixel current for a given brightness, thus eliminating the problems of beam divergence and phosphor saturation that occur in high-brightness CRT's.

The voltage applied across the pixel is the difference between the row-select voltage and the column voltage. For a typical FED, a gate-cathode voltage of approximately 80V is required to achieve full "white" brightness. The pixel OFF current for black level is 50V or less. The modulation voltage used to control the intensity of each pixel is the difference between the white and black levels, or about 30V. From a functional standpoint, the row driver is a very simple circuit that provides only a row-select signal as the display is scanned from one line to the next. The column driver presents gray-scale image information to the pixel and differs from the row driver both in functional complexity and bandwidth performance.

There is more than one way to modulate the pixel intensity with the column driver, and there are tradeoffs with each approach, including power consumption, susceptibility to cathode defects, ability to drive the required load, and display uniformity. The leading approaches are amplitude modulation (AM), pulse-width modulation (PWM), and a mixed AM/PWM approach. Each of these approaches can be used with column drivers configured as either voltage or current sources.

Although small Flat-CRTs have been demonstrated and produced in limited quantities using FED technology, the FED industry faces serious problems in the fabrication and vacuum assembly of large area field emitter arrays due to the inherent vacuum problems and limitations of emissive displays. In the CRT industry projection display tubes are typically much smaller than direct view tubes. A reduction in size would be an advantage for the FED industry. However, to get a very bright displays for projection applications the phosphors must be driven at high power levels, which shortens phosphor and field emitter tip lifetimes dramatically. It is well known in the projector arena that phosphor displays reach their one-half brightness level after the first year of use. In addition, the alignment of the RGB phosphors for a color display can be tricky. Furthermore, the voltages required to penetrate the aluminum coating and operate the phosphors at these levels also shorten the expected lifetime of the field emitters. Due to this rapid aging FEDs are not suitable for projection displays.

As a result, FEDs are currently limited to direct-view displays such as television and computer displays, in which 27 and 17 inch and larger displays are quite common. Unfortunately the thin and thick film processes used to fabricate the cathode and anode structures, respectively, are incompatible. It is very difficult to marry the clean thin-film process with the dirty thick-film process to produce a clean device on which a vacuum can be pulled and maintained over the lifetime of the display. The large display sizes and high resolutions required to meet consumer demand exacerbate this problem by increasing the total surface area of the phosphors, hence the number of hiding places for contaminants that can out gas over time.

The spacers in a FED must be mechanically strong and stable, be compatible with a surrounding vacuum and have a high breakdown voltage. In addition, their electrical resistance must be high enough to minimize leakage current between anode and cathode. Yet the resistance must also to be low enough for charge buildup to dissipate. Currently, the spacers are fabricated separately and then positioned on the anode using a robotic pick and place procedure, which is time consuming and very expensive. The described packaging and performance limitations have impaired the industry's ability to produce an FED having a large display area that is very bright and maintains that brightness over its lifetime.

U.S. Pat. No. 5,196,767 to Leard describes a spatial light modulator (SLM) using a field emitter array to create a charge pattern on light modulating element 14, which may be selected from a group of optical elements including a deformable mirror, citing to U.S. Pat. No. 4,794,296. The mirror configuration in this patent is a single deformable membrane mirror, which is stretched across a support structure and suspended above a pixelated array of charge wells formed on the interior surface of a Charge Transfer Plate (CTP), as described in U.S. Pat. No. 5,287,215 to Warde. The pixelization reduces the effective area of the mirror that can be modulated thereby reducing brightness and/or contrast ratio.

As shown in Warde's FIG. 14, the CTP couples charge from an FEA under vacuum through charge wells in atmosphere. An array of insulating posts formed in or on the CTP supports the deformable reflecting membrane that spans the wells. The CTP serves as a high-density multi-feedthroughs vacuum-to-air interface that both decouples the electron beam interaction from the membrane and provides the structural support required to hold off atmospheric pressure. The vacuum-to-air interface allows the reflective membrane to be built and operated in air rather than a vacuum, which is simpler and cheaper.

However, because the CTP provides structural integrity sufficient to withstand atmospheric pressure, the CTP must be very thick, at least 3 mm for useful display sizes. In order to preserve the resolution of the deposited charge pattern, the rule-of-thumb is that the charge plane should be preferably within one-tenth the width of the pixel and no greater than ten times the width. At large distances, the fringing forces will washout the resolution of the attractive electrostatic forces. Even assuming a fairly large pixel size of 0.1 mm the charge plane could be no greater than 1 mm away and preferably about 10 microns. To effectively move the charge plane closer to the membrane, Warde forms conductive feedthroughs in the CTP to transfer the charge pattern from the backside of the CTP to the wells, which are nominally spaced 2–10 microns from the membrane.

Although the feedthroughs solve the proximity problem they dramatically reduce the amount of charge delivered to the wells. Since charge distributes itself uniformly around the cylindrical feedthrough and the area of one end of a feedthrough might be 1/1000 its total surface area for these dimensions, the amount of charge delivered to the well is reduced by approximately 1/1000. Thus, the FEA has to deliver approximately 1000 times the charge needed to actuate the membrane.

Warde mentions that the FEA can be used to drive the anode structure shown in FIG. 12, in which the readout light is beamed through the support window to the mirror. Note that a CTP cannot be used as the membrane support since the membrane substrate must be transparent. Instead the deformable membrane is stretched across the patterned support structure to form the isolated mirror pixels 36. The FEA writes charge directly onto the membrane, which deforms into the well. As a result, this device is pixelated and has the same drawbacks as discussed above. Furthermore, brightness and particularly contrast ratio suffer due to the amount of light that is scattered off of the support structure. In addition, the resolution of the SLM is limited by the resolution of light modulating element and the CTP, which is significantly less than resolutions achievable by FEAs. Specifically, as resolution increases the task of fabricating the feedthroughs in the CTP becomes increasingly more difficult and the scattering and diffraction losses off of the support structure increase.

U.S. Pat. No. 6,034,810 to Robinson et al describes a light modulator in which a field emitter array is used to address a pixelated mirror array. The FEA deposits a charge pattern on the mirrors or a suspended membrane, which in turn produces electrostatic forces that deflect the individual mirrors in accordance with the amount of accumulated charge. The mirror array in combination with the FEA can be configured in many different ways to implement different actuation and charge control modes. Similar to the Learde device, the resolution of the light modulator is limited by the resolution of the pixelated mirror array and not the much finer resolution of the FEA. As resolution increases the task of fabricating smaller and smaller mirrors becomes more difficult and the scattering and diffraction losses off of the posts and hinges becomes substantial.

SUMMARY OF THE INVENTION

In view of the above problems, the present invention provides a compact, high resolution, bright and long life modulator for projection displays.

This is accomplished by mating a field emission array (FEA) with a deformable light valve modulator (DLVM) of reflective operation in a thin vacuum package. The DLVM includes a continuous film mirror layer formed on or between one or more deformable layers on a transparent substrate. The field emitters (at least one per pixel) are driven to deliver primary electrons that strike and deposit a charge that produces electrostatic forces that locally deform the continuous film mirror layer. To help maintain resolution of the charge pattern, a control grid can be used which focuses the primary electrons and also a collector grid can be used which collects the ejected secondary electrons. Because the mirror layer is a continuous film, i.e. not pixelated, the modulator resolution is limited only by the resolution of the FEA. Therefore the FEA-DLVM of the present invention can achieve significantly higher resolutions than current modulators. Mating the FEA and DLVM technologies also reduces the drive voltage requirements associated with typical FEA driven phosphor displays and scanned beam DLVMs thus improving their performance and extending the lifetime of each.

The charge pattern can be formed in a number of ways including a) patterning the FEA into a number of rows equal to the number of desired scan lines and either fixing the emitter tips to deposit high density dots which merge into a line or by sweeping the emitted electrons along the scan line to deposit a line of charge, or b) patterning the FEA into a number of rows less than the number of desired scan lines, deflecting the emitted electrons orthogonal to the scan line and then sweeping them in a parallel orientation to deposit multiple scan lines for each patterned row.

Color can be achieved by using three modulators, one each for red, green and blue in the manner just described. Alternately, color can be achieved on a single modulator by patterning the FEA into a number of rows equal to the number of desired scan lines, sweeping the electrons along the scan line to write the green image, sweeping the electrons orthogonal to the scan line with a known period to write the red image and sweeping the electrons orthogonal to the scan line with a different period to write the blue image.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a compact, high resolution, bright, long life light modulator that uses a field emitter array (FEA) in combination with a continuous film deformable light valve modulator (DLVM) of reflective operation sealed entirely within a vacuum cell. This device is not limited by the brightness and aging characteristics of phosphors or the size and resolution characteristics of scanned beam modulators. Because the beams do not have to penetrate the phosphors' aluminum coating, the field emitters can be operated at much lower beam energies. This extends the life of the field emitters, relaxes the high voltage requirements on the fabrication process and provides flexibility to optimize target geometry. Lower beam energies also extend the life of the DLVM by reducing the penetration depth of the beam and limiting the generation of X-rays. The ability of the FEA to independently address pixel and sub-pixel sites on the continuous film mirror can be exploited to form a fine charge pattern to improve both resolution and brightness.

FEA-DLVM Architecture

Figure 3:
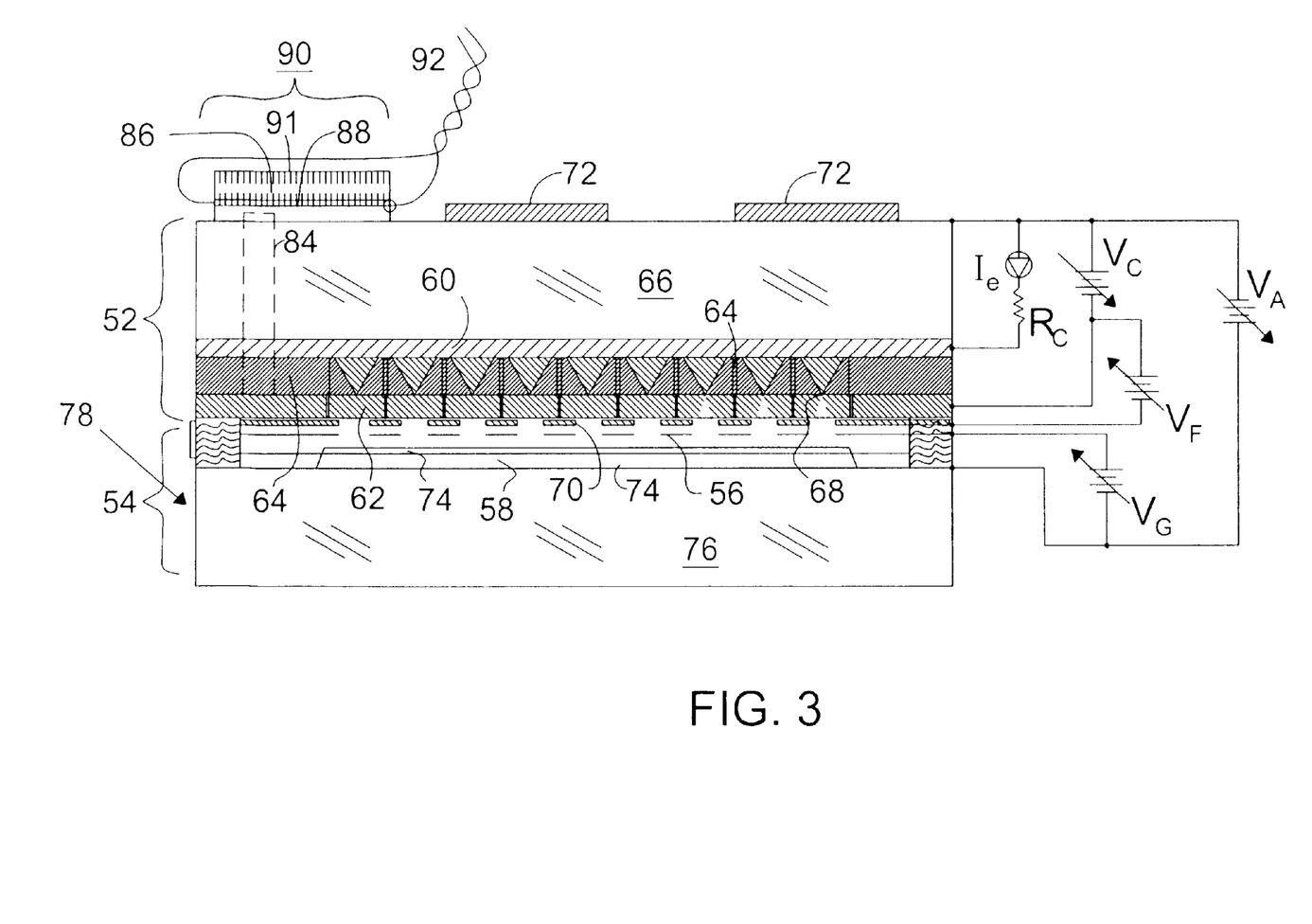
FIG. 3 is a sectional view of a deformable mirror field emission display in accordance with the present invention.
Figure 4:
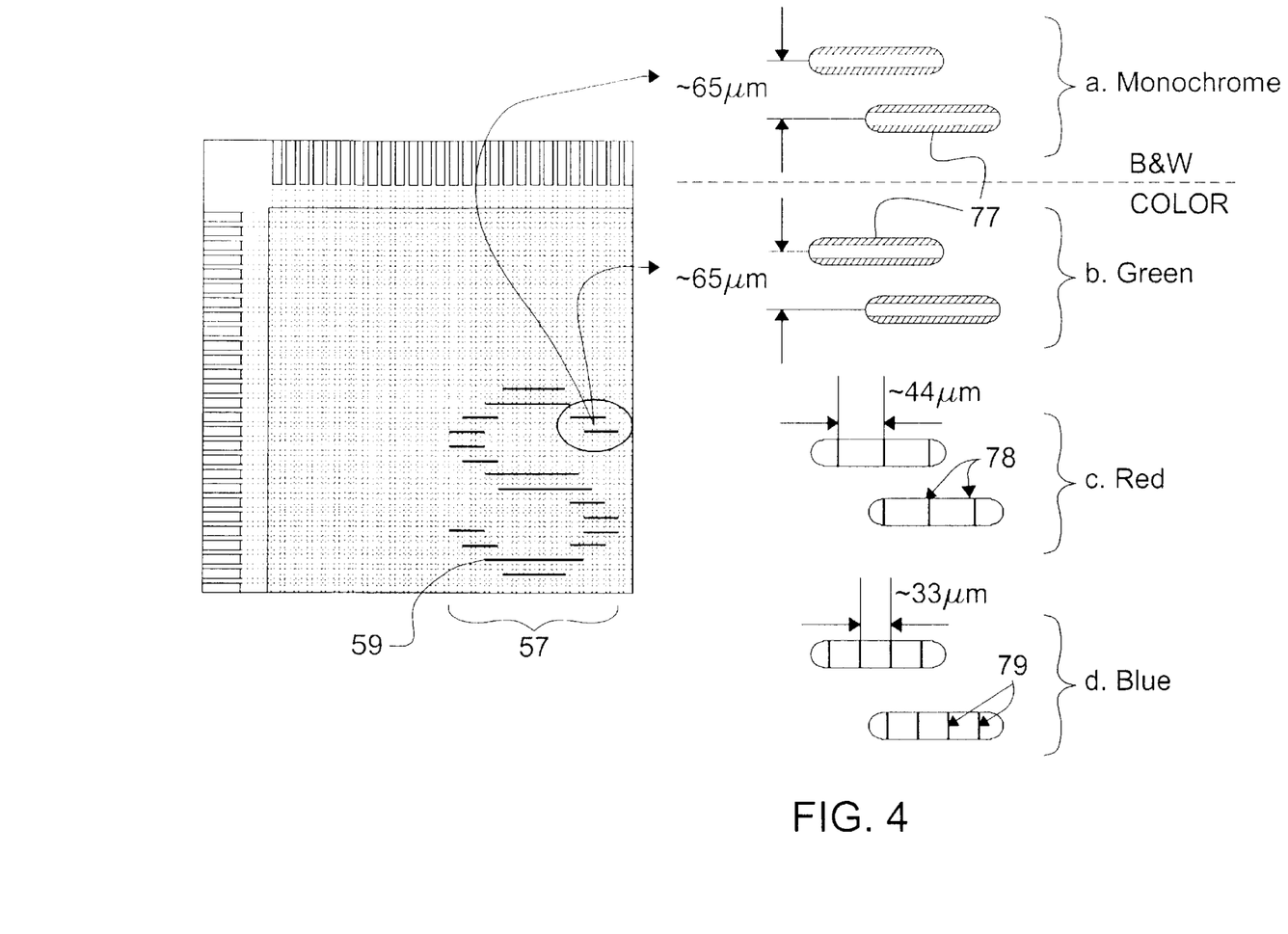
FIG. 4 is a charge pattern diagram illustrating both monolithic and integrated color.
Figure 5:
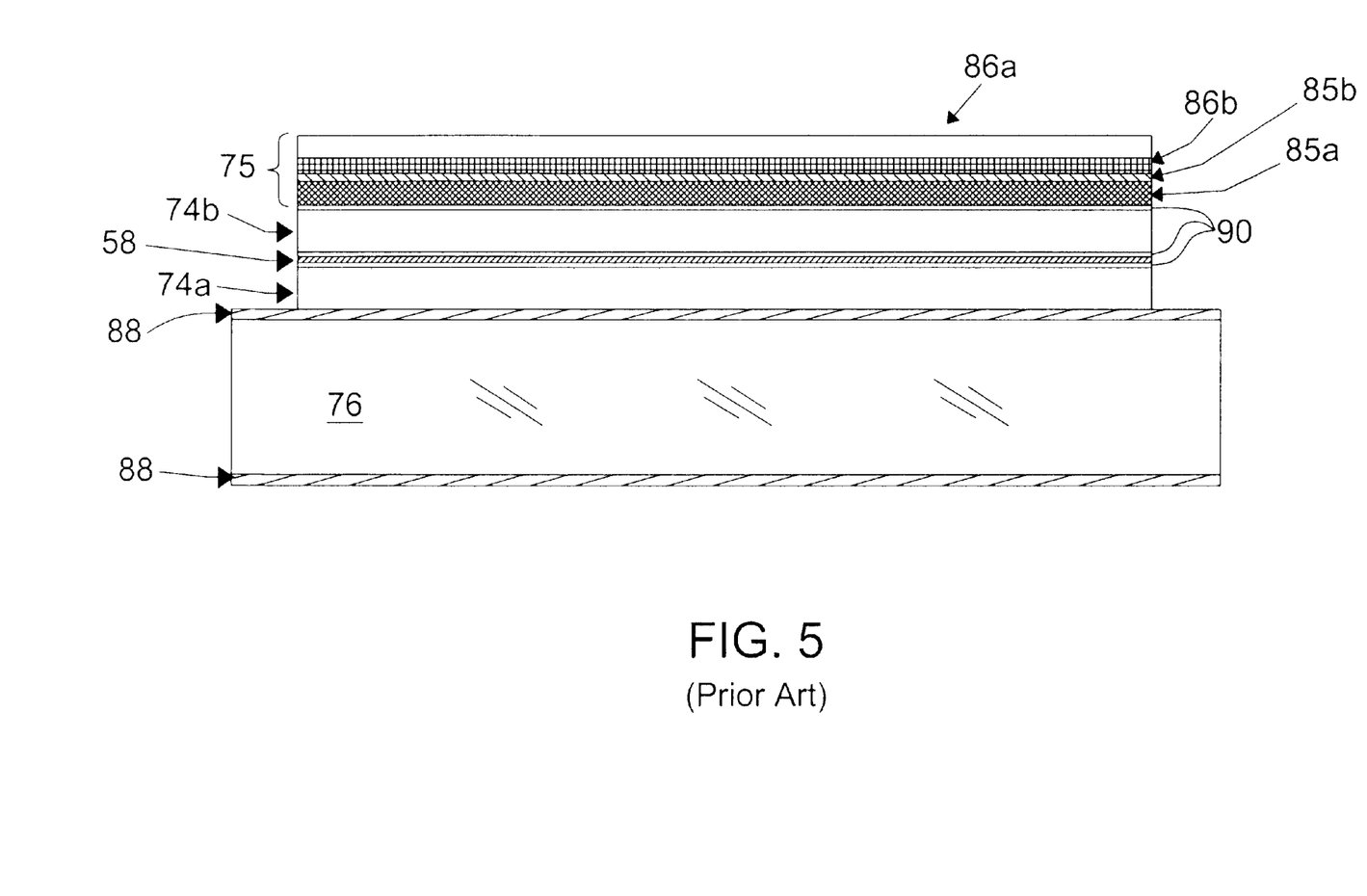
FIG. 5 is a section view of a known DLVM.

As shown in FIG. 3, a vacuum packaged deformable mirror FEA-DLVM 50 uses a FEA 52 of the general type shown in FIG. 1 in combination with a DLVM 54, which includes a continuous film mirror layer 58 that is formed on or between one or more deformable layers 74 on a substrate 76 such as glass (see FIG. 5 for example). FEA 52 emits primary electrons, which are focused and accelerated through a potential $V_A$ to strike DLVM 54. The accelerated primary electrons eject secondary electrons, which are collected by a collector grid 56. The controlled modulation of FEA 52 combined with the collection of secondary electrons forms a charge pattern 57 on DLVM made up of individual lines 59 as shown in FIG. 4, which illustrates both monolithic and integrated charge patterns for a given image. The charge patterns produces electrostatic forces that locally deform deformable layer(s) 74 and mirror layer 58.

Figure 6A:
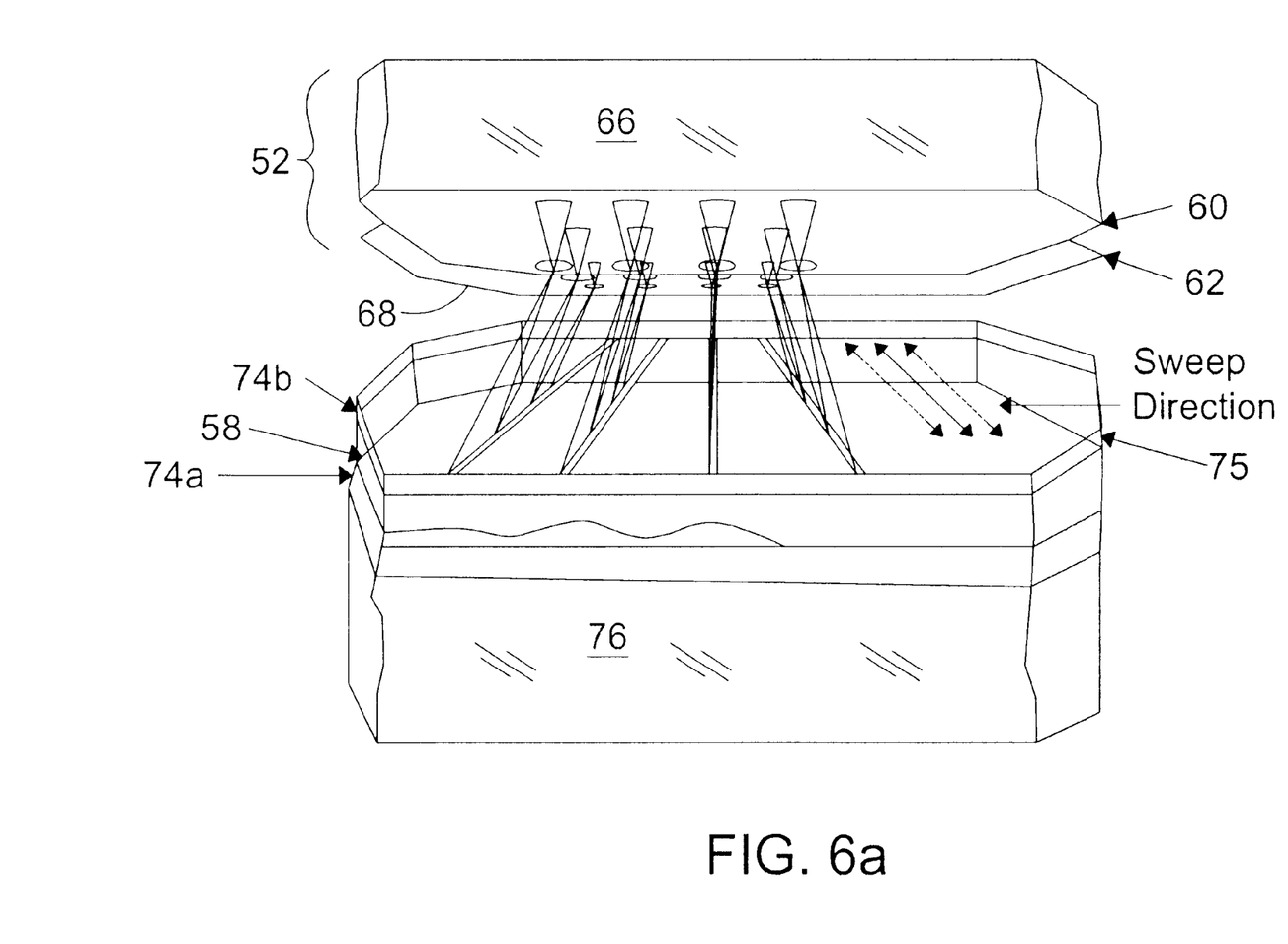
FIGS. 6a–6b are side views of a patterned FEA for forming the scan lines
Figure 6B:
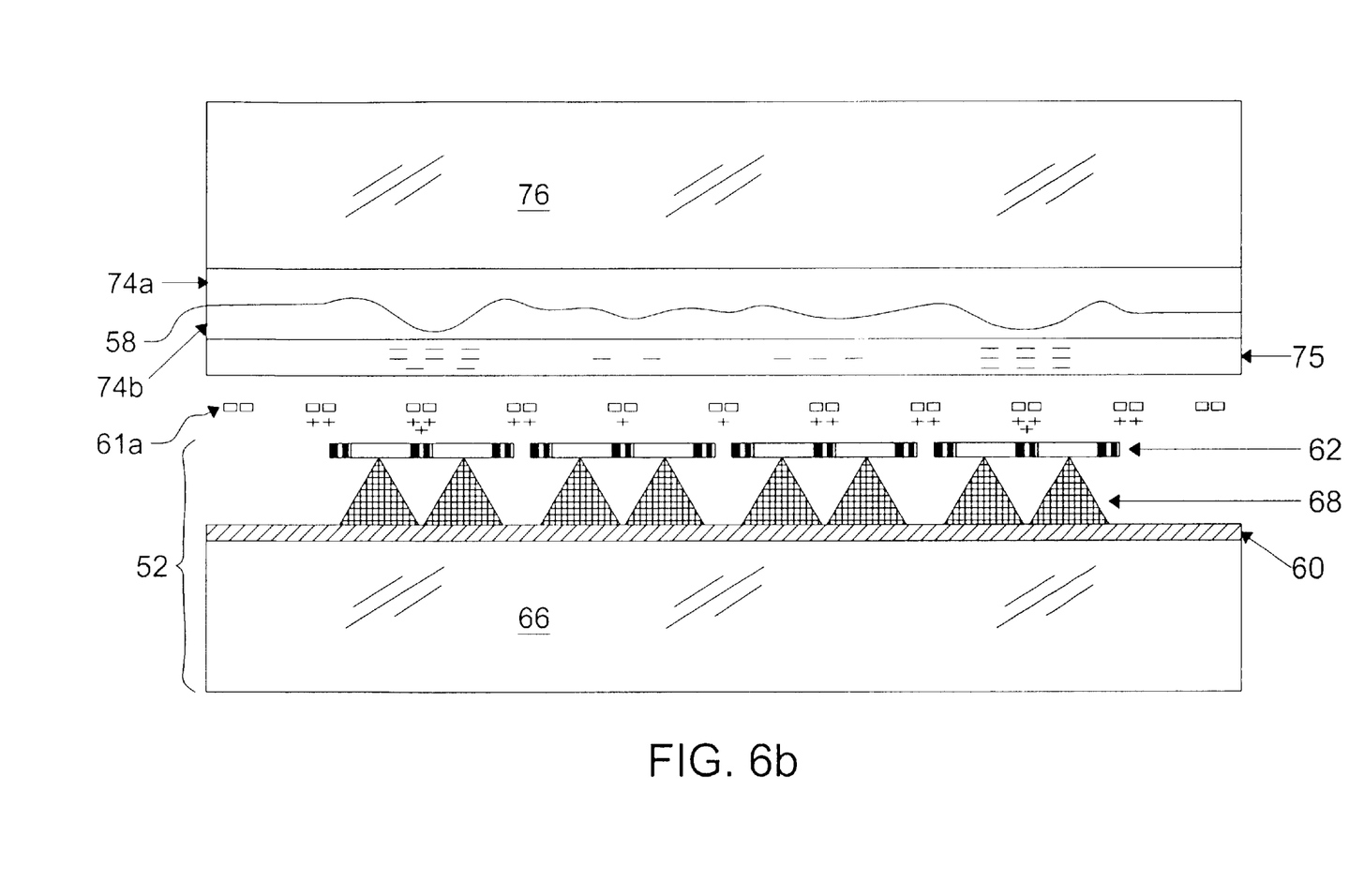
Figure 7A:
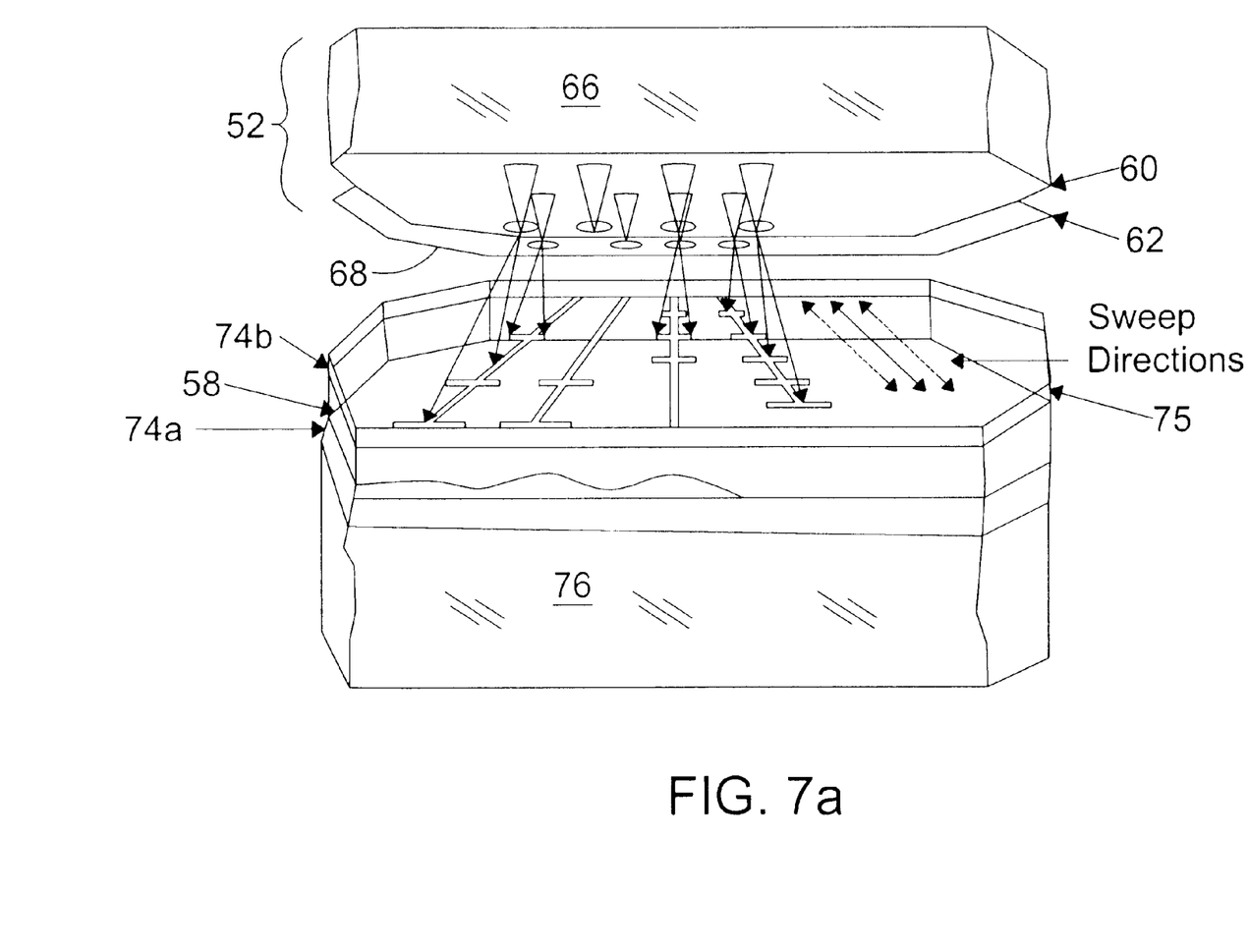
FIGS. 7a–7b are diagrams illustrating the swept FEA.
Figure 7B:
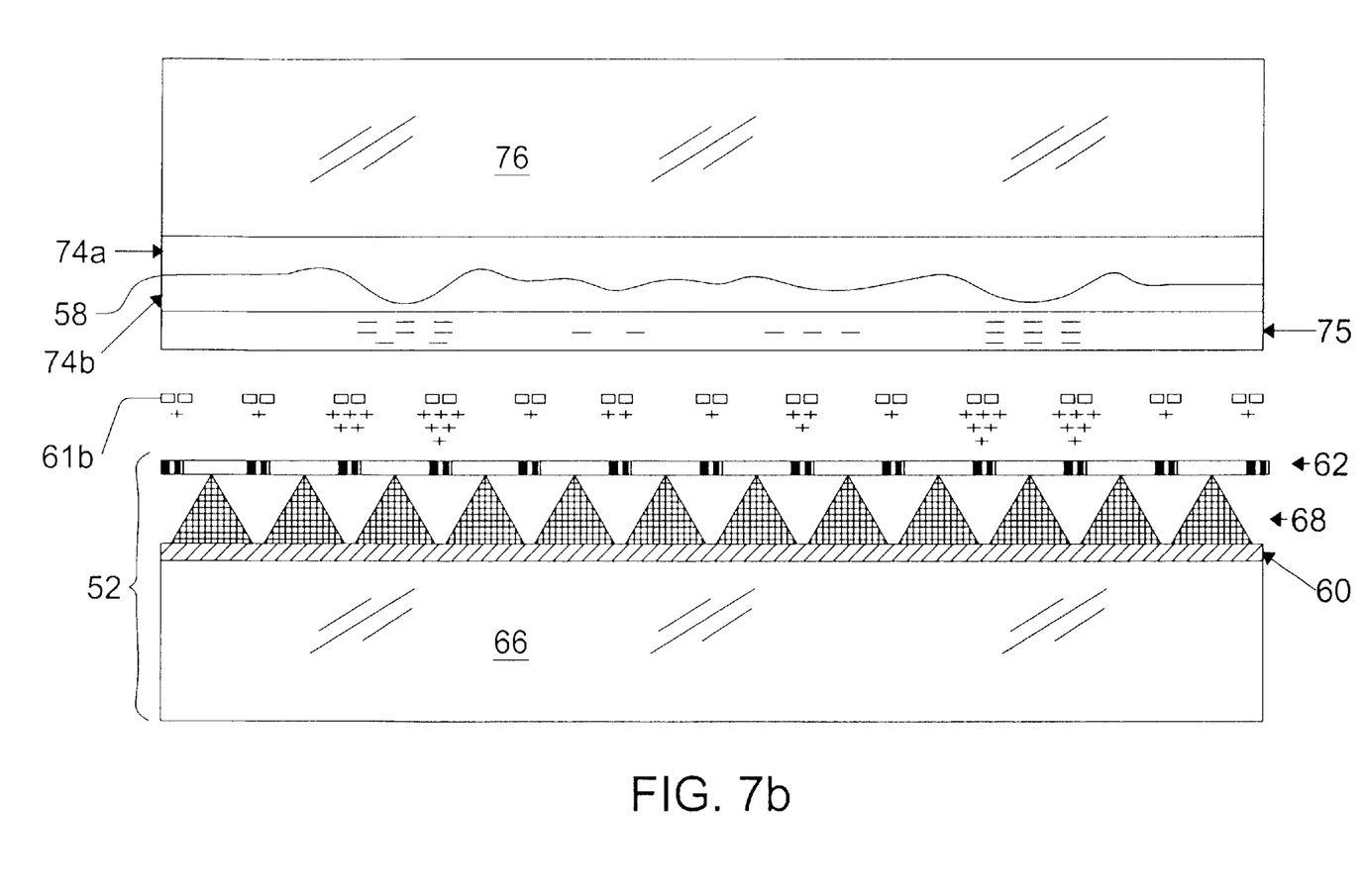

The charge pattern can be formed in a number of ways including a) patterning the FEA 52 into a number of rows equal to the number of desired scan lines and either fixing the emitter tips to deposit high density dots as shown in FIG. 3 or sweeping the emitted electrons back-and-forth along the scan line to deposit a line of charge as shown in FIGS. 6a and 6b, or b) patterning the FEA 52 into a number of rows less than the number of desired scan lines, deflecting the emitted electrons orthogonal to the scan line and then sweeping them back-and-forth in a parallel orientation to deposit multiple scan lines for each patterned row. Color can be achieved by using three modulators, one each for red, green and blue in the manner just described. Alternately, color can be achieved on a single modulator by patterning the FEA into a number of rows equal to the number of desired scan lines, sweeping the electrons along the scan line to write the green image, sweeping the electrons orthogonal to the scan line with a known period to write the red image and sweeping the electrons orthogonal to the scan line with a different period to write the blue image as shown in FIGS. 7a and 7b. As depicted in FIG. 4, the resulting charge pattern includes red, green and blue orthogonal components. Because mirror layer 58 is a continuous film, the resolution limiting factor is the resolution of the FEA and not the DLVM.

Referring again to FIG. 3, FEA 52 is composed of column and row conductors 60 and 62, respectively, which are separated by an insulating layer 64, that define individual pixels or subpixels where they cross. These layers are deposited on an insulating substrate 66, such as glass. The patterned row conductors and insulating layers expose the underlying column conductors 60, which support field emitter tips 68 with their sharp points in close proximity to the row conductors 62.

The column conductors 60 typically serve as the emitter resistors for the field emitter cathodes, and the row conductors 62 serve as the extraction gates. If a positive potential is applied between the extraction gate and a cathode, the sharp emitter tip produces a compression of equipotential lines near the tip 68, which results in electron emission. A decelerating focusing grid 70 held at a potential $V_F$, relatively negative with respect to the cathode, focuses the primary electrons as they are accelerated across this gap. Drive electronics 72 address the FEA 52 a line at a time by enabling the extraction gate 62 for each successive row, and simultaneously modulating the potential on each column, shown schematically as a current source $I_e$ and series resistor $R_e$. As known by those skilled in the art, the majority or controlling part of $R_e$ is typically incorporated into the emitter plane, column, or strip to give desired emission characteristics and performance. When a row is enabled, the emission current flows from the field emitter tips. Amplitude modulation is achieved by varying the voltage $V_c$ that is applied to each column using known amplitude and/or pulse width modulation techniques. The series resistor $R_e$ acts as a ballast to preclude current run away from the tip at high cathode currents.

A pump out tube or aperture 84 in the rear glass penetrates the cavity. Once assembled, the cavity is pumped out at temperature and sealed off to establish a vacuum similar to a CRT. A getter or sublimation pump 90 can be used to neutralize any outgassing from the elastomer materials. Note, however, the outgassing of methane (carbon and hydrogen) from the elastomer may actually benefit the emitter tips by lowering their work function thereby increasing the output current for a given drive voltage. Typically a getter or sublimation pump consists of a small chamber 91 connected to the main cavity by the pump out tube or aperture 84 and a heater element 86 coated with a titanium or barium getter material 88 connected by heater wires 92 to a heater power supply.

After the vacuum package is sealed, further outgassing from internal surfaces can be removed by heating the getter element. The heat either activates the getter directly or sublimes or "flashes" off some of the getter metal. If the metal is sublimed, it coats nearby surfaces and presents a clean reactive surface for outgassed molecules to react with and adsorb to. If the getter is heat activated no metal leaves the bulk of getter material but material changes occur at the critical activation temperature that dramatically affect adsorption rates for incident gas molecules.

The placement of flash type getters is important since it is undesirable to coat either the emitter tips or the anode with getter metal. Consequently, the getter is usually placed in a cavity or separate chamber 90 connected to the main chamber by the pumpout tube 84. One or more getters can be used, and can be of flashable or continuous type. Each flashable getter is flashed only once but each can be flashed at different times during the modulator's life. Continuous getters are generally heated to activate them as needed and each could be activated at different times during device lifetime as with flashable getters.

Although not shown to scale, the FEA-DLVM is a thin device, approximately 11 mm thick. Most of this thickness is due to the glass which must be on the order of 5 mm thick for a 10 cm diagonal device in order to minimize bowing due to the vacuum-atmosphere pressure differential. Thinner packages are possible for devices with a smaller diagonal measure. Generally, the use of spacers to obtain a thinner package would be undesirable since they can introduce scattering, diffraction, and other detrimental effects normally absent from this type device. Even allowing for local modulation of the emitter tips to write the charge lines, the close proximity of a large array of emitter tips to the DLVM greatly enhances beam size and shape uniformity as compared to a raster scanned CRT type DLVM.

Although not commercially successful, to date, the DLVM itself has been around for many years in the form of a raster scanned CRT. As with all scanned electron beam devices, the CRT DLVM is very deep and thus not compatible with the market's demand for compact projection systems. Furthermore, the scanned addressing techniques for writing and then erasing images sacrifice a significant portion of the available brightness and/or are very complicated and can be expensive to implement due to the required gun design, electronics and manufacturing of the CRT. In addition, great care and expense must be taken to maintain a uniform and correct beam shape as the beam scans the target in order to create the proper charge pattern. If allowed to grow and become more oval in the corners as is typical of a scanned electron beam, the image quality will suffer.

IBM pioneered the development of deformable mirror displays in raster scanned CRTs with the advent of the Deformographic Storage Display Tube (DSDT) as described by B. James Ross and Eugene T. Kozol, "Performance Characteristics of the Deformographic Storage Display Tube (DSDT)" 1973 IEEE Intercon Technical Papers, pp. 1–8 and in U.S. Pat. Nos. 3,676,588 and 3,858,080. The heart of the DSDT is a dielectric membrane (target) which consists of an electronically controllable storage substrate, a deformable material layer, and a reflective layer. In one embodiment, the target is mounted in the tube envelope so the storage substrate faces the electron gun chamber of the tube. The deformable material with its conformal reflective layer is isolated in the separate front chamber of the tube. In another embodiment, the target is formed on tube's faceplate so that the deformable material and its conformal dielectric reflective layer face the electron gun chamber. Deformations are created in the deformable material as the result of negative electrostatic charges deposited by the "write" gun. These deformations are typically converted into a visual image by a schlieren optical system. An "erase" gun erases the image by neutralizing the deposited charge pattern. The DSDT never achieved commercial success due to fatigue cracks that would form after extended operation and allow outgassing from the deformable material to poison the electron guns, or else damage would occur to the deformable materials due to radiation such as UV and X-rays leading to a subsequent lack of sensitivity.

As shown in FIG. 5, U.S. Pat. No. 5,822,110 to Dabbaj modifies the DSDT by sandwiching a mirror layer 58 between a pair of deformable layers 74a and 74b and then encapsulating the structure in a capping layer 75. Such a structure improves the outgassing, X-ray and sensitivity problems associated with the DSDT. More specifically, the modulator comprises two deformable layers 74a and 74b, e.g. elastomers, sandwiching conductive mirror layer 58. Layer 74a is transparent to the light being modulated and is firmly attached to transparent substrate 76, typically glass. Dielectric capping layer 75 is formed on top of layer 74b, and is preferably stiffer than layers 74a, 74b. Dielectric capping layer may further comprise a sealing layer 85a, which has low gas permeation rate for good gas-sealing such as Parylene, Siloxane, Formvar or Vacseal which includes a moisture and oxygen barrier 85b in the form or a nitride such as silicon nitride or aluminum nitride. Layer 86b may be used to modify the secondary electron emission characteristics of capping layer 75 while layer 86a can be used to enhance its radiation stopping. Additional layers 88,90 provide one or more functions including adaptation of the coefficient of thermal expansion of various layers, adhesion promotion, barrier layers and anti-reflection.

Dabbaj discloses using a write gun to deposit a charge pattern on capping layer 75. In conjunction with conductive mirror layer 58 which constitutes an electrode, e.g. anode, acting as a reference for charging/discharging the modulator, the charge pattern establishes electrostatic forces which lead to preferably sinusoidal phase or diffraction grating type deformation of mirror layer 58. The local deformations cause incident light to be diffracted into different orders, which are then converted into a visual image by a schlieren optical system. An erase gun (flood or beam) is used to neutralize the charge pattern.

The replacement of the scanning write and erase guns traditionally used in IBM's DSDT and Dabbaj's improved device by a FEA in the manner described in the present invention overcomes the size, frame time utilization (FTU), high voltage, limited resolution and beam forming issues. The FEA-DLVM is thin, can have FTUs approaching 100%, operates at reduced voltages thereby reducing damage due to X-rays or beam penetration, is resolution limited by only the FEA and produces uniformly sized and shaped beams necessary to write the fine charge patterns. In order to mate the FEA with the DLVM, the standard FEA may be modified to write scan lines instead of the small circles or rectangles used to activate the screen phosphors of a typical FED. As described below, this can be accomplished by either patterning the FEA to mirror the desired scan lines or by modulating the field emitters to "sweep" a plurality of scan lines.

As shown in FIGS. 6a–6b, FEA 52 has been patterned such that the number of rows is equal to the number of scan lines shown in FIG. 4. This is accomplished by patterning the gate lines 62 and underlying emitters 68 on the cathode line 60 to the desired line pitch. With this approach the line pitch, and hence the resolution is fixed by the row pitch. While the anode is held at the write potential, a charge pattern is formed on the DLVM by sequentially enabling (or scanning) the row lines. The amplitude of the charge pattern is controlled by the voltage applied to each column. A scan line can be written by depositing a sequence of high density dots.

Alternately, a control grid 61a can be segmented as shown in FIG. 6b to sweep the emitted electrons back-and-forth along the scan line to deposit a line of charge (not shown in FIG. 6a for clarity). A line resolution higher than that of the row lines could be achieved by further segmenting control grid 61a to steer the emitted electrons in two orthogonal directions. The electrons are deflected orthogonal to the row line and then scanned in a parallel direction to write a plurality of scan lines for each row line. The pitch of the control grid can be made finer than the row line since the number of emitter tips, and hence the emission current, diminishes with row line width. Thus higher resolution can be achieved without loss of brightness, but with increased design and addressing complexity.

A single color modulator can be achieved by steering the emitted electrons using a segmented control grid 61b as shown in FIG. 7b (not shown in FIG. 7a for clarity). The FEA is patterned into a number of rows equal to the number of desired scan lines and control grid 61b is segmented to exhibit a quadrapole structure that is capable of deflecting emitted electrodes back-and-forth along a scan line and orthogonal to a scan line. For example, to form a color charge pattern the electrons are swept along the scan line to write the green image, swept orthogonal to and above the scan line with a known period to write the red image and swept orthogonal to and below the scan line with a different period to write the blue image as shown in FIG. 4. A similar procedure is sometimes used to move the beam to address the individual red, green and blue phosphors in a pixel for conventional FEDs. The technique was also employed in the GE Talaria device to write orthogonal gratings on an oil film.

The mating of the FEA addressing and DLVM modulator technologies offers improvements to each. What has hampered the progress of FEA commercialization can be directly or indirectly linked to the phosphor requirements. FEAs incorporating conventional high voltage phosphors can use molybdenum emitter tips, which are fairly well understood and have been used since the early days of FEA development. However, the high voltage requirements are greater than 3 kV so the electrons can penetrate the aluminum anode film covering the phosphors. The phosphors are the basic source of the outgassing and contamination which has limited the lifetimes of high voltage FEDs. On arrival at the anode the high energy electrons bombard the phosphors, releasing oxygen and water vapor which diffuses through the thin aluminum layer after which it can poison the emitter tips. Additionally, some molecules in the released gases are ionized, accelerated, and actually bombard the tips, eventually dulling them via ion induced erosion. On the other hand low voltage color FEAs require special phosphors, some of which contain sulfur or other reactive material that poisons the molybdenum tips. Thus either exotic phosphors or tip materials may be required for the eventual success of FEA displays using low voltage phosphors.

The DLVM can take advantage of low voltage (100–1000V) FEA operation thereby eliminating some of the high voltage contamination issues, but potentially avoiding the tip poisoning issues associated with low voltage phosphors. This low voltage operation will permit longer FEA lifetimes, and may be an FEA technology enabler, given the difficulties encountered in that industry with high voltage operation. In fact, the methane outgassed by the elastomer materials in the DLVM may actual improve emitter performance by reducing their work function.

This low voltage operation can be achieved in one of two ways. Electron-beam-addressed DLVMs use the secondary electron emission curve characteristics of the target dielectric on their surface. Typically the devices are operated around the second crossover, writing at anode voltages above the crossover, and erasing below. By using a dielectric with a secondary crossover point around 500–1000 volts, the FEA can be operated at much lower voltages. Alternatively, the DLVM can be operated about the first crossover at even lower electron energies. For this invention description, operation around the second crossover will be assumed, writing above the crossover at ~2–3 kV, and erasing below the crossover at ~0.5–1 kV, although other write/erase schemes using either the first or second crossover are possible and will be obvious to one familiar with secondary emission.

Advantages are conferred upon the DLVM as well. Typically to maintain electron beam resolution, high beam energies of the order of 10 kV are required. These high energies require that the DLVM dielectric be thick enough (on the order of 1 um) to prevent the electron beam from reaching the elastomer. Additionally the high energy electron beam can produce X-rays of comparable energies, which can penetrate through the oxide to the elastomer. In order to stop these a dense high atomic number oxide must be used as an X-ray absorber, complicating the DLVM design. Because of it's close proximity to the DLVM (a few tenths to one millimeter), focus can be maintained with a low energy electron beam, allowing the secondary emitter layer to be thinner and eliminating the need for an X-ray absorption layer.

Projection FEA-DLVM

Figure 8:
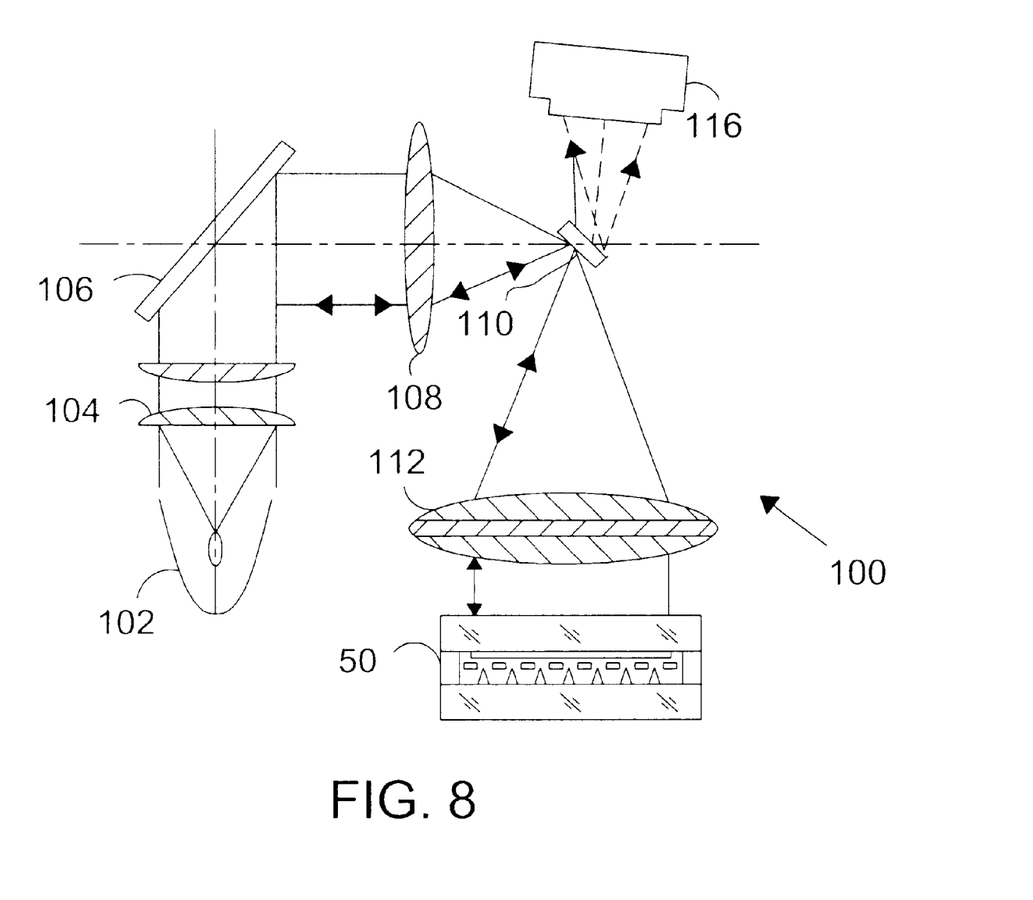
FIG. 8 is a schematic representation of a projection FEA-DLVM system.

As shown in FIG. 8, a monochrome projection FEA-DLVM 100 includes a bright light source 102 such as an arc lamp with a reflector. One of the main advantages of this configuration is the fact that the display brightness is limited only by the size of the arc lamp that can be coupled to the FEA-DLVM, not the emission properties of phosphors. The arc lamp produces divergent light, which is collimated by collection optics 104, selected to absorb the ultraviolet component of the light. A cold mirror 106 passes the infrared component of the light and directs the collimated "cold" light to a condenser lens 108, which focuses the collimated light onto a turning mirror/schlieren stop 110. The turning mirror redirects the now diverging light onto a field lens 112, which recollimates the light and images it onto FEA-DLVM 50.

FEA-DLVM 50, in response to a video addressing signal, imparts a spatial modulation onto the light in proportion to the amplitude of the diffraction grating impressed upon the mirror by the electron beam. The spatially modulated light passes back through field lens 112 where it is focused onto a plane that extends through turning mirror/Schlieren stop 110. The schlieren stop removes the zeroth order diffracted light and undiffracted light, so the light that passes through the projection lens 116 contains only image information.

A color display can be implemented by positioning an RGB color wheel between cold mirror 106 and lens 108, which is commonly referred to as color sequential, using three devices and a color cube or by forming orthogonal charge patterns on the DLVM, which is referred to as spatial color. Spatial color is achieved by patterning the FEA as shown in FIG. 4 to form the basic grating and by modulating the beams as shown in FIG. 7 to form the different orthogonal gratings. Spatial color does not exhibit the motion artifacts associated with a color wheel and is much cheaper and more compact than a three modulator system.

The projection FEA-DLVM provides a number of manufacturing advantages as compared to available phosphor FEDs. First, FEDs are simply not bright enough to be used in a projection system but, as mentioned previously, are limited to direct-view displays. As a result, the FEA-DLVM diagonal measure in a projection system can be much smaller, typically 5 inches versus at least 27 inches for consumer television.

The advantages of a smaller display size are numerous. First, the total enclosed surface area is small so it is much easier to achieve and maintain a good vacuum. Second, it is much simpler and cheaper to handle and assemble 5 inch pieces of glass than 27 inch pieces of glass. Furthermore, for small displays it may be possible to fabricate the entire FEA-DLVM on thin glass since the front and back glass panels only require 40 to 100 mil thickness depending on diagonal measure.

Figure 9:
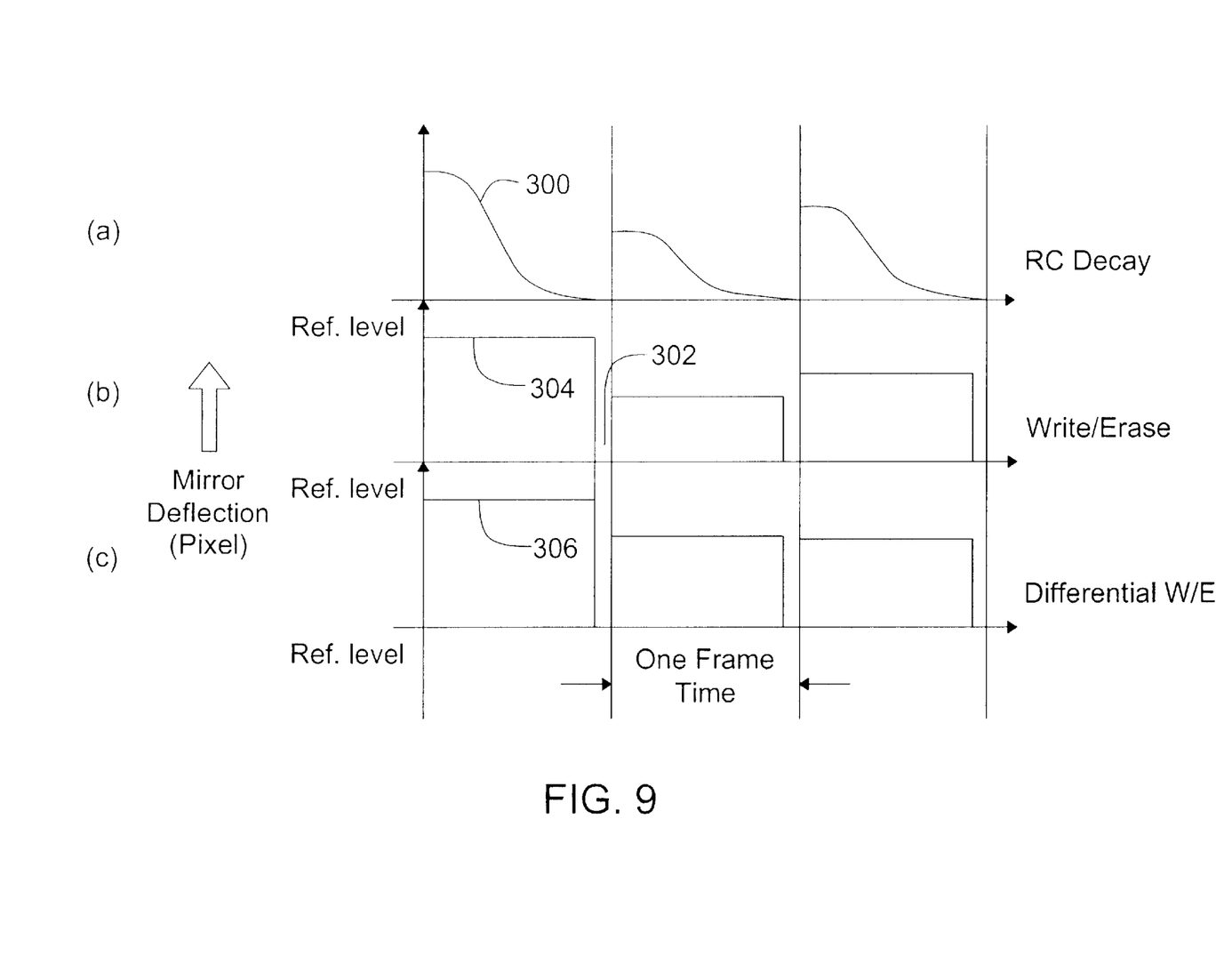
FIGS. 9a–9c are plots of mirror deflection for the different addressing modes.

The DLVM can be addressed using several different techniques including RC-decay, write/erase charge control, and differential charge control as shown in FIGS. 9*a* through 9*c*, respectively. RC-decay, shown in FIG. 9*a* is the simplest but provides the poorest FTU with approximately one-third to one-half of the available light modulated depending upon the exact decay time. If the RC time constant is set so light output decays to ~1/e in one frame time the light output is about ⅓ of the maximum achievable whereas if it is set to ~½ in one frame time the light output approaches one-half of the maximum achievable. In RC-decay, the mirror layer is held at the anode write potential. When the emitter tips are enabled, the mirror is driven to a desired deformation 300 and allowed to decay as the charge on the capping layer bleeds off. In this case the charge must be fully decayed to whatever reference level is chosen in one frame, so some degradation of the charge, the mirror deformation, and hence brightness occurs during the frame.

With the charge control approach, shown in FIG. 9b, the DLVM must first be erased before being driven to a write state where it is held throughout the frame. This requires electrons of two different energies, the write energy above the crossover, and the erase below the crossover. In a CRT-driven DLVM, the anode is held at a fixed potential and the two energies are provided by separate write/erase beams at different potentials. An FEA-driven device can accommodate this dual energy requirement in several ways.

In it's simplest configuration, the anode (DLVM) is identical to that employed in the CRT-based device. The two beam energies can be provided by the same set of emitters or by two separate sets of emitters in each pixel. As an example of the first case assume electron energies of around 2 kV are required for write and 500V for erase. The mirror is held at the write potential of 2 kV, and the row lines enabling writing will gate between ground and about +80V, while the cathode column line modulation will vary between ground (maximum modulation) and 50V (off). In order to erase, the column line must be raised to about 1500 V (with the gate a corresponding 80V higher) in order that the electrons reach the anode at the required 500 V erase energy. For this approach, provision must be made to drive the column in an analog fashion near ground for write and to raise it to 1500 V for erase. In order to simplify the electronics, two sets of emitters (and two column lines) per pixel can be used, one driven at write voltage and one at erase. This approach requires higher resolution fabrication, since twice as many tips are required per column for the same cathode current. In both cases, some resolution can be bought back by using a segmented control grid to paint the electrons across several rows as described earlier. In either case, the emitters would be raised to the erase potential to clear the anode, and then switched to the write potential as shown in 9(b).

Additionally, some of the fabrication complexity can be transferred from the FEA to the DLVM if the acceleration is provided by a segmented grid fabricated on the surface of the DLVM, so that some columns can be written while others are erased. In all the above cases only the potential difference between the tips and the DLVM is important, so part of the potential difference can be provided by positively biasing the anode. For example if the crossover is at 1000 V and write and erase are done at 1500V and 500V respectively, the column drivers only have to operate at −500 V and +500V if the anode is biased at 1000V.

If the DLVM is operated around the first crossover, the variation in electron energy due to the video modulation of the column lines becomes a greater perturbation of the anode energy. Hence, the secondary emission will vary with video amplitude. For example, if the crossover is now at 300V with write at 200V and erase at 400V, the 50V variation in column voltage becomes a 16% variation in write energy at the anode. In this case it may be preferable to ground the mirror, fix the write and erase potentials of the column lines and perform the analog modulation with the row lines. The roles of the columns and rows become reversed with the enabling (write/erase/off) done by the columns, and the modulation performed by the rows. (Alternatively to preserve the progressive scan this can be viewed as columns as gates and rows as cathode lines.)

Differential charge addressing (FIG. 9c) requires two cathode lines and two sets of emitters per pixel. This addressing mode can only be accomplished with a secondary emission layer, which consists of islands of conductor isolated by a dielectric grid. Both erase and write electrons are written to each end of the conducting block such that the resulting charge on the block is the sum of the charges delivered by both sets of emitters. Device resolution can be maintained by pixellating the surface of the DLVM. Pixellation can be done with a metal grid whose potential can be controlled electrically, or by patterning the surface with two dielectrics with different crossovers such that one is in erase mode at both the write and erase potentials of the other. In this manner the differential surface potential developed by the two dielectrics enhances the deflection of the mirror.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A light modulator, comprising:

a thin vacuum cell having a transparent faceplate;

a target in said vacuum cell adjacent said faceplate, said target comprising a continuous film mirror layer formed on or between one or more deformable layers;

a field emitter array (FEA) in said vacuum cell that comprises an array of field emitter tips that emit primary electrons that strike the backside of the target causing secondary electrons to be ejected; and a collector grid in said vacuum cell that collects the ejected secondary electrons leaving a charge pattern on the backside of the target that produces electrostatic forces that deform said continuous film mirror layer.

2. The light modulator of claim 1, wherein said charge pattern comprises a number of scan lines, said FEA being patterned into a number of rows equal to the number of scan lines.

3. The light modulator of claim 2, wherein said field emitter tips are locally modulated to sweep the primary electrons back-and-forth along the respective scan lines.

4. The light modulator of claim 3, further comprising a segmented control grid that sweeps the primary electrons back-and-forth.

5. The light modulator of claim 1, wherein said charge pattern comprises a number of scan lines, said FEA being patterned into a number of rows less than the number of scan lines, said field emitter tips in each said row being locally modulated so that the emitted primary electrons sweep a plurality of scan lines.

6. The light modulator of claim 5, further comprising a segmented control grid that sweeps the primary electrons in each said row back-and-forth parallel to and orthogonal to the scan lines.

7. The light modulator of claim 1, wherein said charge pattern comprises a number of scan lines, said FEA being patterned into a number of rows equal the number of scan lines, said field emitter tips in each said row being locally modulated so that the emitted primary electrons sweep a first primary color along the scan lines, a second primary color orthogonal to and above the scan lines at a known period, and a third primary color orthogonal to and below the scan lines at a different period.

8. The light modulator of claim 6, further comprising a segmented control grid that sweeps the primary electrons in each said row back-and-forth parallel to and orthogonal to the scan lines.

9. The light modulator of claim 1, wherein said FEA is patterned into a number of rows of field emitters that address the target's continuous film mirror layer, the resolution of said light modulator being limited by the resolution of the patterned FEA.

10. The light modulator of claim 9, wherein said field emitters are locally modulated to effectively increase the resolution of the patterned FEA.

11. The light modulator of claim 1, wherein the field emitter tips have a characteristic work function that defines their output of primary electrons for a given drive voltage, said deformable layers comprising materials that when outgassed in the vacuum cell increase the work function thereby enhancing the performance and extending the life of the emitter tips.

12. The light modulator of claim 11, wherein said deformable materials outgas methane.

13. The light modulator of claim 1, wherein said target comprises said continuous film mirror layer sandwiched between a first transparent deformable layer and a second insulating dielectric deformable layer and a third dielectric insulating layer on said second layer, at least one of the layers between the second layer and the transparent faceplate being electrically conductive so that when the third dielectric layer receives the charge pattern the continuous film mirror layer is locally deformed by electrostatic forces occurring between the charge pattern and the conductive layer.

14. The light modulator of claim 13, wherein said target does not comprise an X-ray absorption layer.

* * * * *